(12) United States Patent
Grillet et al.

(10) Patent No.: US 12,172,391 B2
(45) Date of Patent: Dec. 24, 2024

(54) CASSETTE, LAYING HEAD COMPRISING SUCH A CASSETTE, LAY-UP INSTALLATION AND METHOD, REFILL METHOD AND PREPARATION METHOD

(71) Applicant: INSTITUT DE RECHERCHE TECHNOLOGIQUE JULES VERNE, Bouguenais (FR)

(72) Inventors: Gregory Grillet, Gramat (FR); Matthieu Kneveler, Les Sorinieres (FR)

(73) Assignee: INSTITUT DE RECHERCHE TECHNOLOGIQUE JULES VERNE, Bouguenais (FR)

( * ) Notice: Subject to any disclaimer, the term of this patent is extended or adjusted under 35 U.S.C. 154(b) by 1566 days.

(21) Appl. No.: 16/467,857

(22) PCT Filed: Dec. 7, 2017

(86) PCT No.: PCT/EP2017/081864
§ 371 (c)(1),
(2) Date: Jun. 7, 2019

(87) PCT Pub. No.: WO2018/104467
PCT Pub. Date: Jun. 14, 2018

(65) Prior Publication Data
US 2020/0070437 A1    Mar. 5, 2020

(30) Foreign Application Priority Data
Dec. 9, 2016  (FR) ...................................... 1662228

(51) Int. Cl.
*B29C 70/38*  (2006.01)

(52) U.S. Cl.
CPC .......... *B29C 70/388* (2013.01); *B29C 70/382* (2013.01); *B29C 70/384* (2013.01); *B29C 70/386* (2013.01); *B65H 2701/377* (2013.01)

(58) Field of Classification Search
CPC ..... B29C 70/38; B29C 70/382; B29C 70/384; B29C 70/386; B29C 70/388
See application file for complete search history.

(56) References Cited

U.S. PATENT DOCUMENTS 5,076,871 A * 12/1991 Frye ........................ B29C 33/68
156/84
6,026,883 A *  2/2000 Hegerhorst ........... B29C 70/384
156/499

(Continued)

FOREIGN PATENT DOCUMENTS

EP    2 851 183 A1    3/2015
FR    2 919 518 A1    2/2009

(Continued)

OTHER PUBLICATIONS

European Office Action issued Dec. 3, 2021 in corresponding European Patent Application No. 17 808 519.7, 6 pages.

(Continued)

*Primary Examiner* — Alex B Efta
(74) *Attorney, Agent, or Firm* — Oblon, McClelland, Maier & Neustadt, L.L.P.

(57) ABSTRACT

Cassette of at least one fibrous reinforcement wound into at least one roll of textile in order to carry out laying up, including:
  a receiving structure adapted to receive said at least one roll and to enable it to be unwound,
  a connecting system for removably fixing the cassette to a laying head part, itself adapted to be connected to a laying up robot.

17 Claims, 5 Drawing Sheets

(56) References Cited

U.S. PATENT DOCUMENTS

| | | | |
|---|---|---|---|
| 6,544,367 B1* | 4/2003 | Fujimoto | B29C 70/388 |
| | | | 156/425 |
| 7,137,182 B2 | 11/2006 | Nelson | |
| 2004/0098852 A1 | 5/2004 | Nelson | |
| 2004/0144473 A1 | 7/2004 | Payne | |
| 2006/0042066 A1 | 3/2006 | Nelson | |
| 2006/0054272 A1 | 3/2006 | Panetta et al. | |
| 2007/0029030 A1* | 2/2007 | McCowin | B29C 70/545 |
| | | | 156/173 |
| 2009/0266485 A1* | 10/2009 | Torres Martinez | B29C 70/38 |
| | | | 156/324 |
| 2012/0261069 A1 | 10/2012 | Blot et al. | |
| 2015/0075713 A1 | 3/2015 | Madsen | |
| 2015/0360424 A1 | 12/2015 | Williams et al. | |

FOREIGN PATENT DOCUMENTS

| | | |
|---|---|---|
| JP | 2004-181683 A | 7/2004 |
| WO | WO 2011/033240 A1 | 3/2011 |
| WO | WO 2013/159137 A2 | 10/2013 |

OTHER PUBLICATIONS

International Search Report issued Mar. 13, 2018 in PCT/EP2017/081864 filed Dec. 7, 2017.

French Preliminary Search Report issued Aug. 7, 2017 in Patent Application No. 1662228 filed Dec. 9, 2016.

* cited by examiner

CASSETTE, LAYING HEAD COMPRISING SUCH A CASSETTE, LAY-UP INSTALLATION AND METHOD, REFILL METHOD AND PREPARATION METHOD

FIELD OF THE INVENTION

The present invention concerns the lay-up of preforms, in particular composite material dry preforms, to be more precise a fibrous reinforcement for composite materials, in particular of NCF (Non Crimp Fabric) type.

The invention very particularly concerns a cassette, a laying head including such a cassette, an installation and a method for automated preform lay-up, a method of refilling a cassette and a method of preparing a cassette.

PRIOR ART AND DISADVANTAGES

The manual laying up of composite preforms by laminator-molder operatives is known. The laminator-molder trade demands qualities such as accuracy, discernment and skill. This labor is very highly qualified. This trade is exercised in workshops with atmospheres laden with dust, odors and solvents. The laminator-molder produces, individually or in small runs, pieces based on fibers, composites or resins. The production of the finished product may be long and laborious. The use of cutting tools and the dust oblige the laminator-molder to wear appropriate individual protection equipment (IPE).

Recruiting qualified labor is complicated and time consuming. Depending on the size of the production workshop, the safety of persons, making the workspace compliant with standards may have a high cost. Finally, improving productivity is difficult because of the investment that i s therefore necessary.

There is known from EP 2 851 183 a method for applying a fibrous material to a vertical surface, including the following steps: spraying an adhesive onto the vertical surface and then applying the fibrous material to the surface, spraying an adhesive onto the fibrous material again and then applying the fibrous material, and finally injecting the layers of fibrous material with a resin. Pressing means supporting a roll of fibrous material, forming a laying head and including a robot connector are used for the application of the fibrous material to the vertical surface.

Further known from FR 2 919 518 is a roll changing device for a pre-impregnated laying head. The laying head includes a roll of composite tape, including the composite tape and a support for the composite tape, wound together, and a spool for rerolling the support part for the composite tape when the latter has been deposited. The dimensions and the mass of the roll are such that it is possible to change it by moving up an auxiliary support not carrying a roll and introducing spindles from one side of the axis of the roll in order to have the roll supported by the spindles and to remove it by movement in translation away from the auxiliary support. This roll replacement system is not possible for large and very heavy rolls.

The basic NCF type fibrous reinforcement is generally packaged in the form of spools or rolls of textile or tape with a maximum width of 3200 mm. These have various winding diameters, which can be as much as 350 mm. The thickness of the bottom lays can be from 0.5 mm to almost 5 mm, depending on the application.

Depending on the complexity of the textile, for example a 45° directional line with a thickness of 0.5 mm, manipulation of the textile during installation causes the laminator-molder problems. The weight and the overall size of the rolls sometimes complicate their use. Handling very wide rolls is particularly complicated, owing to the mass of the rolls. In particular, the latter cannot be supported from only one side of the core of the roll or of the mandrel.

Now, it may be necessary to change roll after each run, that is to say after laying up one layer, in particular to change lay nature, textile nature or dimensions. In most cases it in fact proves necessary to change roll for each lay because of the multidirectional nature of the fibrous reinforcement and in order to comply the rules governing symmetrical distribution of the orientations of the lays. This necessitates facilitating and accelerating the change of roll so as not to immobilize the lay-up robot for too long during the change.

There is therefore a need for more reliable laying up of preforms, in particular in long production runs. Also of interest is facilitating the production of preforms.

Cassette

In a first of its aspects, the present invention consists in a cassette of at least one fibrous reinforcement wound into the form of at least one roll of textile in order to perform lay-up, in particular for the production of a preform, including:
  a receiving structure adapted to receive said at least one roll and to enable it to be unwound,
  a connecting system for removably fixing the cassette to a lay-up robot, in particular to a laying head part itself adapted to be connected to the lay-up robot.

Thanks to the invention, there is provided a cassette, or roll-carrier, that serves as a pay-off reel, that is easily refilled with a roll by detaching the cassette from the robot, in particular from the laying head part, with the aid of the connecting system, and then fastening it to the latter, in particular via fastening it to the part of the laying head, after refilling with a roll. This enables automation of the lay-up of preforms, in particular flat and dry preforms, for example for long production runs.

The cassette that is detached and that which is attached afterwards are advantageously different, with the aim of saving time. In particular, the detached cassette is put down to refill it with a roll, whereas the cassette that is fastened on is taken from a waiting stock, being already filled with a roll at the time of its attachment.

The structure receiving the cassette may have an upper surface configured to receive a core of the roll, in particular an upper surface with recessed patterns, in particular two patterns, such as grooves, to receive ends of the core of the roll or of at least one mandrel carrying the roll. The receiving structure is advantageously adapted to enable easy roll replacement, simply by raising or positioning the latter on the receiving structure of the cassette, for example without necessitating removal of the cover. The core of the roll may simply be put down on the receiving structure, in particular in the recessed patterns. However, in a preferred embodiment, mechanical retention of the core of the roll, in particular by centering and locking means, is provided at least at one end of the core of the roll. Such centering and locking means may be mechanical, for example including a hook. An advantage of the presence of such means is that it enables the roll to be referenced relative to the cassette.

The receiving structure may form a frame including two lateral columns interconnected by at least one front column. The lateral columns are preferably arranged to receive the ends of the core of the roll or of at least one mandrel carrying the roll. The lateral columns may include at least part of said upper surface, in particular a part with the recessed patterns. The frame may be configured to provide a central interior opening between the lateral columns and the front column in order to accommodate the roll and to allow it to be unwound.

The connecting system for the removable fixing of the cassette may be configured to allow the cassette to be connected to a part, in particular an upper part, of a laying head carried by the robot. In this case, the connecting system may include at least one clamping element for clamping and/or centering the cassette on the first part, in particular the upper part, of the laying head. The connecting system may include a plurality of clamping elements, disposed for example on the upper surface of the receiving structure of the cassette, in particular pneumatic or hydraulic type centering and clamping elements. A benefit of such centering and clamping elements is that they are reliable, in terms of safety, at a reasonable cost. They may function in such a manner that it is necessary to inject air or oil to release the clamping action. Even in the event of an electrical power outage, the cassette therefore remains fastened to the robot or to the part, in particular the upper part, of the laying head.

The cassette may include a rotation support subassembly carried by the receiving structure. This kind of rotation support subassembly may be configured to take the load of the roll. It may include a plurality of rollers, in particular four rollers, fixed to the receiving structure, rotatably mounted with a rotation axis parallel to the axis of the roll. The rollers may be fixed two by two to a lower face of the lateral columns of the frame of the receiving structure, if necessary. The rollers may be adapted so that they are able to be in contact with the mandrel or mandrels, two by two. The rotation support subassembly may equally include an adjustment structure so that, whatever the diameter of the roll, of the mandrel, the roll can be centered so that the robot has a stable frame of reference.

The cassette may further include a guide subassembly for the fibrous reinforcement textile carried by the receiving structure and adapted to guide the textile during unrolling of the roll. The textile guide subassembly may enable the textile to be recentered and maintained at the required position. It may also guarantee retention of the textile with a vertical exit. The textile guide subassembly may include at least one roller and/or at least one plate that is or are configured to direct the fibrous reinforcement textile when unrolling the roll. The roller or rollers may be adapted to redirect the textile as a function of the diameter of the roll. The plate or plates may be adapted to favor guidance. The textile guide subassembly may be fixed to the receiving structure, for example by forming or by being fixed to a rear column of its frame, which rear column is opposite the front column and separated from the latter by the central opening for the roll.

The cassette may include a measuring subassembly configured to measure the length unwound from the roll and/or to monitor the speed at which the fibrous reinforcement textile is fed. Said measuring subassembly may include at least one sensor for measuring the length unwound from the roll and/or a sensor for monitoring the speed at which the fibrous reinforcement textile is fed. The same sensor, for example a Doppler type contactless sensor or a coding wheel applied to the textile, may fulfill both these roles.

The textile is preferably multidirectional. In this case, it is at least bidirectional, but may equally be tridimensional or quadridimensional.

The textile may be non-woven, in particular of the non-crimp fabric (NCF) type. In this case, the textile includes a plurality of layers of unidirectional fibers, disposed one on the other with a different angular orientation of the fibers, thus forming a multidirectional textile. Alternatively, the textile is woven, then being multidirectional. The textile may be deformable, that is to say composed of continuous fibers arranged in defined directions and assembled in woven or non-woven form.

The fibers constituting the textile may be chosen in the group consisting of carbon fibers, glass fibers, aramid fibers, ceramic fibers, polyester fibers, fibers of plant origin, in particular flax fibers, preferably carbon or glass fibers, and a mixture thereof. The fibers may be continuous or short.

To produce the textile, it is possible to use non-woven NCF fibers that form a raw material of lower cost compared to woven textiles. Also, the orientation of the fibers for lay-up may be chosen, which makes possible mastery of the mechanical properties of the parts that will be produced from the preform, or even for performance to be better.

The dimensions of the textile wound into the form of a roll may be a width between 50 mm and 5000 mm inclusive, in particular between 50 mm and 3200 mm inclusive, in particular between 1270 mm and 3200 mm inclusive. The width of the textile from the roll is therefore advantageously large in order to have long fibers. The length dimension of the textile wound into the form of a roll may be between 500 mm and 50 000 mm inclusive.

The cassette may be sized in such a manner as to enable accommodation and unrolling of the roll, as a function of its dimensions. The robot will advantageously be adapted to be able to manipulate the load generated and/or the dimensions of the cassette and of the roll will be a function of the capacity of the robot.

The textile may be chosen so as to enable production of a dry preform by laying it up. By "dry preform" is meant a fibrous preform containing less than approximately 20%, in particular less than approximately 5%, of a thermoset or thermoplastic polymer, in percentage by weight relative to the total mass of the preform. It is to be noted that the preform could include a plurality of layers, separate from one another or otherwise, of one or a plurality of inserts, for example foam inserts, in particular PET (polyethylene terephthalate) foam or unidirectional carbon textile, interconnected or not by one or more seams. The dry preform could be used as a reinforcement phase of a fibrous reinforcement. The preform could be draped flat. The preform could thereafter be moved to be thermoformed and/or to be impregnated with at least one polymer, in a mold, to form a final part. The final part could be obtained by impregnation, in particular injection or infusion, of a polymer in the liquid or pasty state into said dry preform, in such a manner as to form a composite material part.

Laying Head

In another of its aspects, the invention further consists in, in combination with the foregoing, a laying head for laying up at least one fibrous reinforcement in textile form wound into the form of textile in at least one roll, including:

a laying head first part, in particular upper part,
 a cassette as defined above, disposed in a second part, in particular a lower part, of the laying head and connected by the connecting system to the first part, in particular the upper part, of the laying head,
 means for connection to the robot.

The first part, in particular the upper part, of the laying head advantageously includes complementary clamping means for the removable fixing to said connecting system of the cassette.

The head, and in particular the first part, in particular the upper part, of the head may be adapted to feed and to cut the textile, deposit an adhesive and hold the cassette. Alternatively, some or all of these functions, and the corresponding technical features described hereinafter, may be integrated into the cassette. The head advantageously integrates a majority of the functions. Thanks to the invention, only the cassette is loaded on each change of roll, not the entire head. As cassette changes are frequent in the intended use, in particular after laying up each lay, the time and cost saving generated is appreciable in the context of industrialization.

The laying head and in particular the first part, in particular the upper part, of the head—or, in a variant, the cassette—may include at least one element chosen in the group constituted by a system for driving the roll in rotation, a system for cutting the roll, a presser element and an adhesive laying system.

When the laying head includes a system for cutting the roll, the latter enables the textile from the roll to be cut to the required length. It is therefore possible to produce a clean cut, for example to start from zero. This operation may be carried out above a waste receptacle.

The adhesive depositing system of the laying head, when present, may be adapted to make it possible to deposit an adhesive, in particular a glue or a double-sided tape, on the fibrous reinforcement textile or on the support for lay-up, before, during or after lay-up, preferably at least before lay-up.

The system for driving the roll in rotation is configured to rotate the roll in order to bring about the unrolling of the fibrous reinforcement textile. It may be adapted to manage the exit speed of the textile and to immobilize it when necessary. It may include a driving motor and a wheel driven in rotation by the driving motor, the wheel being connected to the core of the roll so as to drive the latter in rotation, in particular being connected by friction to at least one mandrel.

When present on the laying head, the presser element enables the textile to be held while cutting it in order to control the end of laying up a lay of textile. It may include at least one plate and at least one cylinder for pressing the plate against the textile.

Means for connection to the robot may enable fixed connection of the head to the robot. In this case, the connecting means may include screws or the like. Alternatively, the connection may be removable, the connection means then including, for example, pneumatic or hydraulic type clamping elements, inspired by the connecting system of the cassette.

Lay-Up Installation

In another of its aspects, the invention also consists in, independently of or in combination with the foregoing, an installation for laying up preforms, in particular dry preforms, with fibrous reinforcement on a laying support, the installation including at least one robot carrying a laying head as defined above and/or carrying a cassette of at least one fibrous reinforcement wound into at least one roll, in particular a cassette as defined above.

The lay-up installation may include a crossmember to support the robot mounted on a bench to enable movement of the robot along a longitudinal axis parallel to a lay-up direction. The crossmember is advantageously adapted to move above the laying support with the aid of the bench on which it rests and relative to which it can be moved along a longitudinal axis parallel to the lay-up direction. The robot can therefore move above the laying support in order to carry out the lay-up to form the preform.

The lay-up installation may include at least one storage space accessible to the robot, the or each storage space including at least two zones each for receiving a cassette, in particular a zone for receiving a waiting cassette loaded with a roll and a zone forming an empty space for receiving a cassette to be refilled or to be placed on standby. The storage space may further include in each zone a support cradle to receive a cassette. The presence of the storage space enables the operative to prepare at least one cassette in parallel with the lay-up operation, which enables time to be saved in the production of the preform. The storage space, accessible and preferably forming a spatial frame of reference for the robot, enables the latter to offload an empty or inappropriate cassette and to load a cassette carrying an appropriate roll.

In a variant that is not preferred, the or each storage space may be adapted to receive laying heads and not only cassettes, the robot being configured to offload and to load a laying head and not only a cassette.

The installation is advantageously disposed in a closed environment with aspiration of dust. This then allows the operatives not to be provided with specific individual protection equipment.

In one particular embodiment, the robot used to carry the cassette and/or the laying head includes a base, in particular positioned crosswise, and an arm mobile with a plurality of, in particular six, rotation axes or degrees of freedom. This flexibility enables the robot to provide some or all of the functions of lay-up, inclination of the laying head, depositing the adhesive, changing the cassette. The robot may be different without departing from the scope of the invention.

A second robot may be provided, being for example carried by and movable in translation on the bench, for example in such a manner as to deposit inserts or other elements on the lay-up and/or to produce one or more seams. This second robot may be an arm type robot mobile in translation along the longitudinal axis of the bench, the arm preferably being mobile with six degrees of freedom. This can make it possible to produce a so-called "sandwich" preform structure, which is a structure formed on an insert or core or kernel, sandwiched between two exterior layers of one or more other materials. The kernel may be light in weight and of low mechanical strength, whereas the exterior layers may have a high mechanical strength. The thickness of the kernel may be approximately ten times greater than the thickness of the exterior layers.

The installation may include a laying support adapted to receive the preform laid up during the laying of the fibrous reinforcement textile. This kind of laying support may constitute a spatial frame of reference for the robot. The laying support may include at least one fixed table carrying a laying frame supporting a sacrificial mattress for any seams to be produced on the preform after lay-up. The sacrificial mattress may constitute a support, in particular a foam or a latex support, for the textile that holds the textile at the correct height and is disposable after a certain number of cycles because it has been pierced by the needles during the production of the seams. The laying support may further include lifting rings, fixings for clamping the tables and/or centering means for positioning the laying frame on the table.

In another of its aspects, independently of or in combination, even partial combination, with the foregoing, the invention consists in an installation for laying up preforms, in particular dry preforms, with fibrous reinforcement on the laying support, the installation including:

at least one robot carrying a cassette of at least one fibrous reinforcement wound into at least one roll, the cassette including a receiving structure adapted to receive said at least one roll and enabling it to be unwound, and at least one storage space accessible to the robot, the or each storage space including at least two zones each for receiving a cassette.

The storage space may be as defined above.

In this case, the cassette does not necessarily include a connecting system as defined above. The robot may then include means for holding the cassette.

Lay-Up Method

In another of its aspects, in combination with the preceding aspect, the invention further consists in a method for laying up, in particular laying up flat, a preform, preferably a dry preform, with fibrous reinforcement on a laying support using the installation as defined above, including the following steps:

loading the robot with a cassette carrying at least one roll of fibrous reinforcement textile, commanding the robot to position the cassette and/or the laying head above the laying support, moving the robot in a lay-up direction and commanding the simultaneous unrolling of the roll to produce the preform.

Thanks to the invention, the method of laying up a preform is automated, which makes possible improved productivity and reliability.

The preform is advantageously draped flat, on flat tooling. Alternatively, the tooling may be inclined or positioned on a dolly for the production of curved parts.

During the loading step, the robot may load the cassette under the first part, in particular the upper part, of the laying head. The cassette is preferably centered and maintained by the connecting system, for example connected to the complementary clamping means of the first part, in particular the upper part, of the laying head.

When the laying head includes a system for depositing an adhesive, the method may include the steps consisting in commanding the robot to move the laying head angularly, in particular in rotation, to incline it in order to bring the textile and the adhesive into contact. The method may then include the step consisting in commanding the robot to move the laying head to press the textile onto the adhesive. It is to be noted that the vertical position of the textile is generally the best position for feeding it. On the other hand, this position may be problematic at the outset, when triggering feeding. In this case, the inclined position may be preferable.

Combined movement of the system for driving the roll in rotation and a crossmember carrying the robot may be employed to effect in the lay-up direction the travel necessary to cover the laying support with the preform.

The method may include the step consisting in cutting the textile using the system for cutting the textile from the roll, when present, in order to trim the textile to the required length.

The robot may thereafter be used either to perform a new lay-up process on the same laying support or on another laying support or to load a new cassette, as described hereinafter.

In particular, the method may include the step consisting in loading a new cassette after laying up each lay and before laying up the next lay. The change of roll and therefore of cassette after laying up each lay may in fact be necessary because of the multidirectional nature of the fibrous reinforcement and in order to comply with the rules with regard to symmetry in the distribution of the orientations of the lays.

The time needed to produce a preform, with the lay-up of a plurality of lays of textiles, the addition of possible inserts and seams, including the duration of the lay-up method according to the invention, may be as follows, depending on the type of preform. It may be between 2 and 30 minutes inclusive as a function of the size and of the weight of the preform. The lay-up speed could be between 100 mm/s and 1000 mm/s inclusive, for example equal to 300 mm/s. For a part weighing of the order of 15 kg, the production time of the preform could be between 5 minutes and 10 minutes inclusive. For a 500 kg part, the production time of the preform could be between 20 and 30 minutes inclusive.

Refilling Method

In another of its aspects, in combination with the foregoing, the invention also consists in a method of reloading with a cassette using an installation as defined above, including the steps consisting in:

commanding the robot carrying a first cassette to offload the latter, in particular with the aid of the connecting system of the first cassette, and commanding the robot to load a second cassette present in the storage space, in particular using the connecting system of the second cassette.

The manipulation times are therefore reduced thanks to the possibility of reloading with a cassette using the robot. Refilling a cassette may be carried out for example because the roll is empty or almost empty, or because it is necessary, for example at the end of a run, to change the type or dimensions of the textile or fibrous reinforcement material to continue lay-up. Thanks to the invention, it is therefore possible to change rapidly the type of textile or roll (thickness, fiber orientations, dimensions of the roll, for example). The time to reload a cassette is therefore optimized and short compared to the lay-up time.

The robot advantageously includes control means of the connecting system of the cassette in order to enable it to move from a locked position, fixed directly or indirectly to the robot, to an unlocked position for unloading the cassette.

The robot may include holding means for retaining the cassette, preferably on the part of the laying head. In this case, the connecting means of the cassette may exclusively have a role of the centering the cassette on the first part, in particular the upper part, of the laying head, for example, and include only centering pins.

In a variant that is not preferred, the robot may load or unload the entire laying head provided with a cassette, and not the cassette alone.

Cassette changing can make it possible to change the type of fibrous reinforcement in the roll. The refilling method may be executed after laying up each lay and before laying up the next lay. A new roll and therefore a new cassette is therefore used for laying up each lay. Changing the roll and therefore the cassette after laying up each lay may in fact be necessary because of the multidirectional nature of the fibrous reinforcement and in order to comply with the rules of symmetry in respect of the distribution of the orientations of lays.

Method of Preparing a Cassette

In another of its aspects, the invention finally consists in, in combination with the foregoing, a method of preparing a cassette as described above, including the following steps:

positioning at least one roll of fibrous reinforcement textile on the receiving structure of the cassette, in particular by manipulating, for example simultaneously, the two ends of a core of the roll or of mandrels received on the receiving structure, and placing the cassette in a storage space, in particular on a cassette support cradle.

The method may further include the step consisting in adjusting the length of fibrous reinforcement unwound from the roll relative to the textile guiding subassembly, for example before placing the cassette in the storage space. The operative can therefore adjust the textile so that a few centimeters of it exit the bottom of the cassette.

The method may further include the step consisting in inserting a mandrel, in particular an expandable mandrel, at each end of a core of a roll of fibrous reinforcing textile before positioning the roll on the receiving structure. The operative can insert mandrels on either side of the core of the roll, which is generally made of cardboard. The mandrels are for retaining the roll and guarantee concentric placement of the fibrous reinforcing textile from the roll. The mandrels disposed on either side of the core of the roll and received by the receiving structure of the cassette may be expanded, that is to say that each mandrel is expanded when there is no longer any air. When loading the roll onto the cassette, the expandable mandrels can be positioned in the vicinity of the roll rotation support assembly, when present on the cassette.

The roll may be loaded onto the cassette with a handling arm, given the weight of the roll, in a manner known in itself, using a gripper, a hook or the like.

FIGURES

The invention will be better understood on reading the following description of nonlimiting embodiments thereof and examining the appended drawings, in which.

Figure 15:
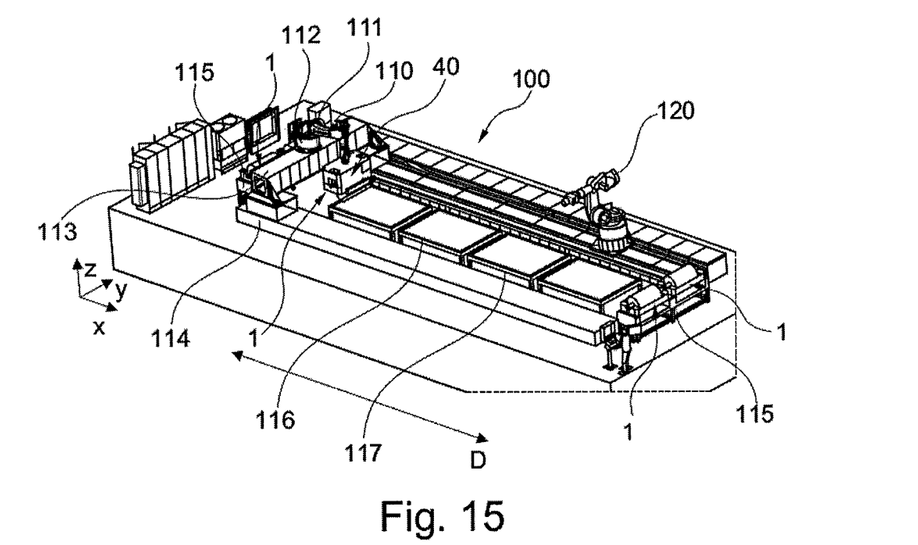
FIG. 15 is a diagrammatic perspective view of one example of an installation according to the invention.

There has been represented in FIG. 15 an installation 100 according to one embodiment of the invention including a laying head 40 carrying a cassette 1 and supported by a robot 110, itself carried by a crossmember 113.

The crossmember 113 is mounted on a bench 114 and can be moved, above the lay-up line, in a lay-up direction D, shown by a double-headed arrow, perpendicularly to the rotation axis X of the roll. The crossmember 113 makes it possible to support the weight of the robot 110 carrying the laying head 40 and to move the robot 110 in the lay-up direction D, in particular during the laying of the textile, by movement on the bench 114, in order to produce a preform.

Figure 1:
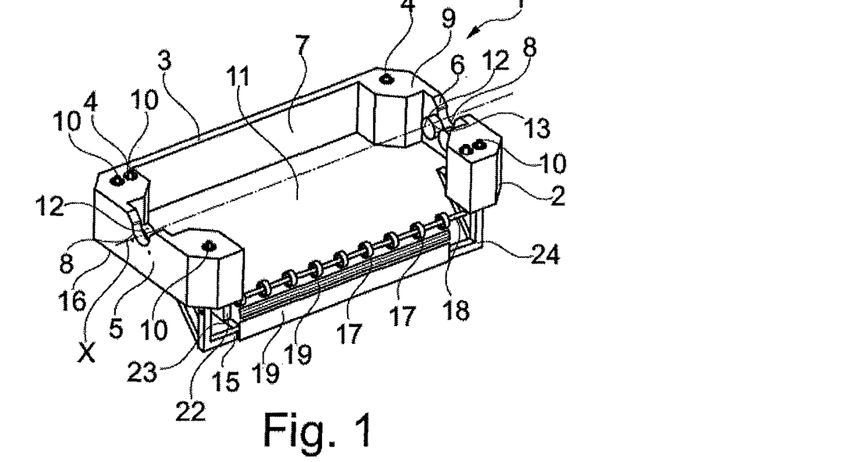
FIG. 1 is a diagrammatic perspective view of one example of a cassette according to the invention, represented with no roll of fibrous reinforcing textile.

There is shown on its own in FIG. 1 the cassette 1 of fibrous reinforcement wound in textile form in a roll, not shown in this figure to clarify the drawing, for the production of a preform, in particular a dry preform. The cassette 1 provided with a roll B can be seen in FIG. 19 for example. The cassette 1 includes a receiving structure 2 adapted to receive the roll and to enable it to be unwound. The cassette 1 further includes a connecting system 4 for removably fixing the cassette 1 to a robot in order to carry out the lay-up and to be offloaded by the robot in order to enable its replacement by another cassette.

In the example shown, the receiving structure 2 includes a frame 3 formed of two lateral columns 5 and 6 interconnected by a front column 7. Each lateral column 5 and 6 has on an upper surface 9 of the receiving structure 2 a recessed pattern formed by a groove 8, of substantially semicircular shape in this example, to receive one end of at least one mandrel or a core of the roll.

In this example the roll is adapted to rest freely with its core on the receiving structure 2 of the cassette 1, which makes it possible to facilitate removing a roll and refilling the cassette 1 with a roll.

The front column 7 that connects the lateral columns 5 and 6 makes it possible to stiffen the assembly. In this example the frame 3 is substantially rectangular, the front column 7 and the lateral columns 5 and 6 forming three sides of a rectangle and preserving a central opening 11 to receive the roll. The textile is unwound from the roll on the side opposite the front column 7, as described hereinafter.

Figure 2:
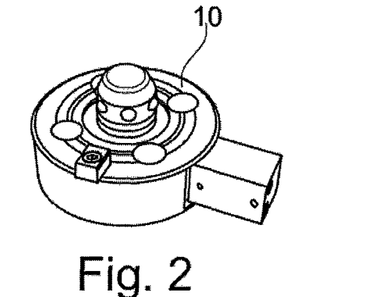
FIG. 2 is a diagrammatic perspective view, on its own, of one example of a connecting system of the cassette from FIG. 1.
Figure 3:
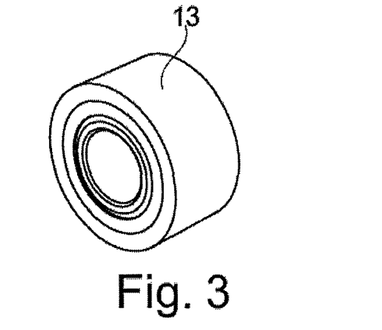
FIG. 3 is a diagrammatic perspective view, on its own, of a roller of a rotation support subassembly of the cassette from FIG. 1.

In the example considered here, the connecting system 4 includes clamping elements 10, visible on their own in FIG. 2, disposed in the corners of the frame 3 of the receiving structure 2. In this example, they are removably fixed to a part, in this example the upper part, of a laying head carried by the robot, as described hereinafter.

By "connecting system for removable fixing to a robot" is therefore meant, throughout the description, that the removable fixing of the cassette to the robot may preferably be effected indirectly by means of an element such as a part, in particular the upper part, of a laying head, or other element, or directly to the robot, in particular to an arm of the robot, although this is not preferable.

In this example, as can be seen here, the connecting system 4 includes six clamping elements 10. At each of the two diametrically opposite corners of the upper surface 9 is fixed a single clamping element 10 and at each of the other two diametrically opposite corners are fixed two clamping elements 10, as can be seen in FIG. 1. In the example shown, each clamping element 10 also enables centering of the cassette and is of pneumatic or hydraulic type, being actuated by injection of air or of oil. The clamping elements 10 may be such as the centering and clamping elements sold by the company Halder. The connecting system 4 may be different without departing from the scope of the invention.

In this example the cassette 1 also includes a rotation support subassembly 12 carried by the receiving structure 2. To be more precise, the rotation support subassembly 12 includes a plurality of rollers 13, four in number in this example, present two by two at the bottom of the groove 8 on the interior side of the lateral columns 5 and 6. They are configured to support the weight of the roll and to accompany its rotation.

In this example the cassette 1 also includes a subassembly 24 for guiding the textile 15 fixed to the frame 3 connecting the lateral columns 5 and 6 on the side opposite the front column 7. The subassembly 24 is fixed to the lower surface 16 of the receiving structure 2, as can be seen in FIG. 1, at one end of the lateral columns 5 and 6 opposite that which connects them to the front column 7. The guide subassembly for the textile 15 is adapted to guide the fibrous reinforcement textile during unrolling from the roll and in this example includes a plurality of rollers 17 carried by a shaft 18 and mobile in rotation about that shaft 18, the shaft 18 being parallel to the front column 7 and to the rotation axis X of the roll.

Figure 4:
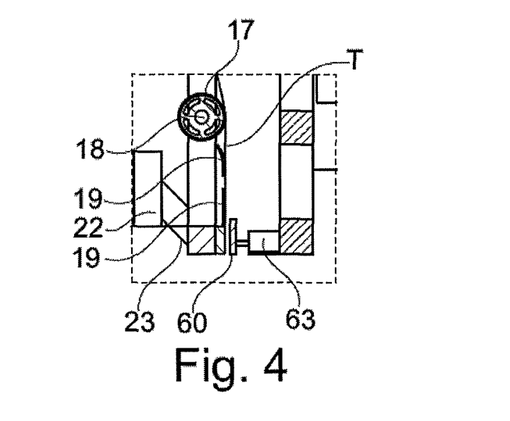
FIG. 4 is a diagrammatic part-sectional view of the textile guide subassembly of the cassette from FIG. 1.

The guide subassembly for the textile 15 also includes a plurality of guides in the form of plates 19 disposed substantially vertically and parallel to the rotation axis X of the roll, including a slightly curved plate, as can be seen in FIG. 4, so as to guide the textile T visible in FIG. 4.

Figure 5:
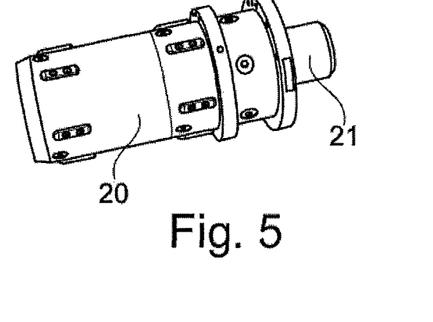
FIG. 5 is a diagrammatic perspective view, on its own, of one example of an expandable mandrel that can be inserted in the roll to be received by the receiving structure of the cassette from FIG. 1.

There has been represented in FIG. 5 one example of an expandable mandrel 20 that can be fitted to the core, in particular the cardboard core, of the roll during installation of the latter on the cassette 1. The end 21 of the mandrel 20 shown in this figure may for example rest in one of the grooves 8 of the cassette 1 from FIG. 1. During the placement of the mandrel 20, once the latter has been inserted into the core of the roll, the mandrel 20 is adapted to be expanded when at rest, the compressed air contracting it. The mandrel 20 therefore increases in volume once there is no longer any air, in order to be fixed to the core of the roll. Of course, a mandrel 20 of this kind is then provided for each of the lateral ends of the core of the roll.

In this example the cassette 1 also includes a measuring subassembly 22 configured to measure the length unwound from the roll and/or to monitor the speed at which the textile T is fed. To this end, the measuring subassembly 22 includes a sensor for measuring the length unwound from the roll and/or a sensor for monitoring the speed at which the fibrous reinforcing textile T is fed. A single contactless sensor may perform these two measuring and monitoring roles, of the type using the Doppler technology, or a coding wheel applied to the textile. A supporting bracket 23 is provided in this example in order to secure it to the cassette 1.

Figures 6, 7, 8, 9:
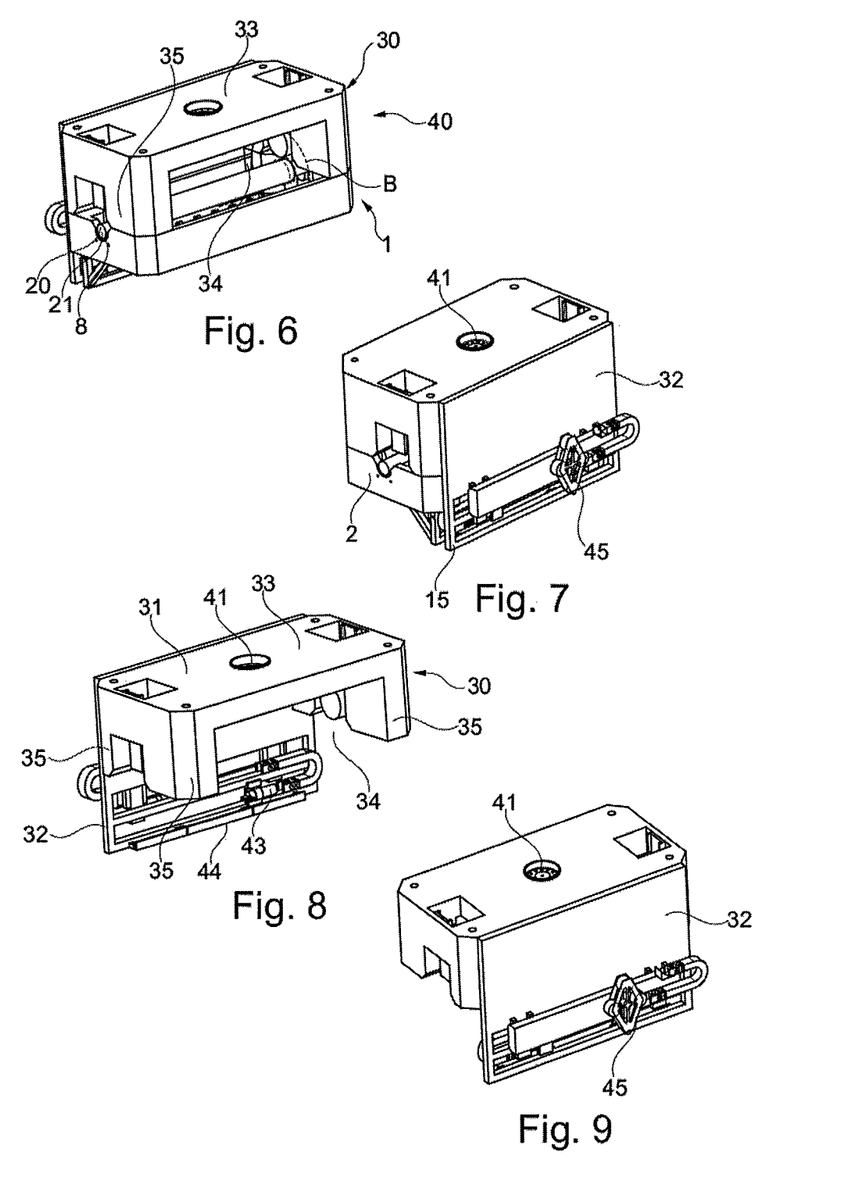
FIG. 6 is a diagrammatic three-quarter perspective view of one example of a laying head according to the invention.
FIG. 7 is a diagrammatic three-quarter perspective view from the rear of the laying head from FIG. 6.
FIG. 8 is a view similar to FIG. 6, representing only the upper part of the laying head from FIG. 6.
FIG. 9 is a view similar to FIG. 7, representing only the upper part of the laying head from FIG. 7.

The cassette 1 is intended to be fastened to a laying head upper part 30 to form the laying head 40 according to the invention, visible in FIGS. 6 and 7. In this example the role of the laying head upper part 30 is to form a cover of the cassette, thus covering the roll, to connect the cassette 1 to the robot, and also to carry a plurality of elements described hereinafter for the placement of the textile T, cutting it, depositing an adhesive on the textile or on the lay-up support.

In these figures there has been represented the laying head 40 accommodating the roll B of fibrous reinforcing textile T with the mandrel 20, the end 21 of which resting in the groove 8 of the cassette 1 can be seen.

The laying head upper part 30 can be seen on its own in FIGS. 8 and 9. The upper part 30 includes a structure 31 with columns 35 extending above and in line with the latter and forming the cover 33 of the receiving structure of the device 1. Unlike the cassette 1, it does not include a central opening 11 defined by the frame 3 to enable the positioning and the unrolling of the roll, but a solid upper part accommodating the means 41 for connection to the robot. The head upper part 30 nevertheless forms an interior space 34 to accommodate the top of the roll.

The laying head upper part 30 includes clamping means complementary to the connecting system 4 of the cassette 1 so as removably to fasten the cassette 1 and the head upper part 30 in order to form the laying head 40. The complementary clamping means cannot be seen in the figures; this is in order to clarify the drawings. Each may consist of a ring including a groove in which the connecting system comes to be clamped, for example with the aid of balls of the connecting system that come to be accommodated in the groove. The connecting system is detached from the complementary clamping means by releasing the balls.

Figure 10:
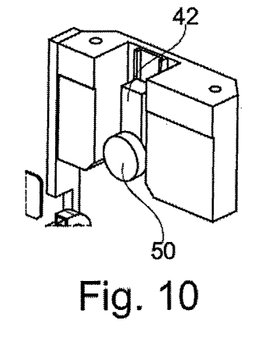
FIG. 10 is a diagrammatic perspective view, on its own, of a system for driving rotation of the roll, present on the head from FIG. 7.
Figure 11:
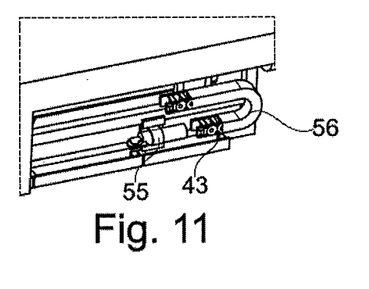
FIG. 11 is a diagrammatic perspective view, on its own, of a cutting system of the roll of the laying head from FIG. 6.
Figure 12:
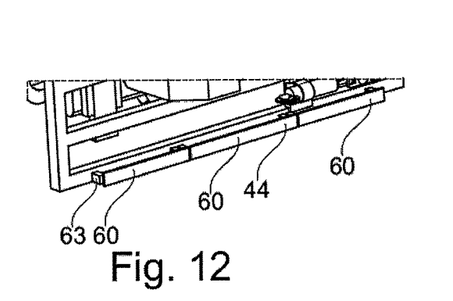
FIG. 12 is a diagrammatic perspective view, on its own, of the pressing element of the laying head from FIG. 6.
Figure 13:
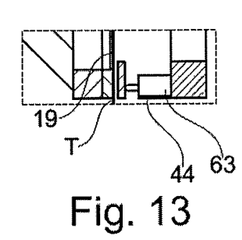
FIG. 13 is a diagrammatic part-sectional view of the pressing element from FIG. 12.
Figure 14:
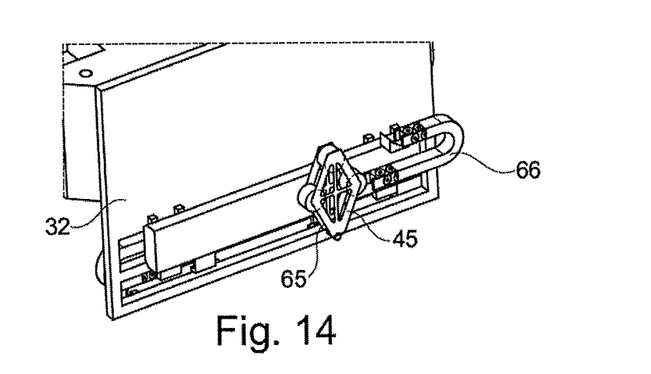
FIG. 14 is a diagrammatic perspective view, on its own, of the system for depositing an adhesive of the laying head from FIG. 6.

In this example the head upper part 30 of the laying head 40 includes a system 42 for driving the roll in rotation, represented in FIG. 10, a cutting system 43 visible in FIG. 11, a pressing element 44 visible in FIGS. 12 and 13, and a system 45 for depositing an adhesive visible in FIG. 14.

A plate 32 is fixed substantially vertically to the back of the head upper part 30 and covers the rear column 24 of the cassette 1. In this embodiment it carries the cutting system 43, the pressing element 44 and the system 45 for depositing an adhesive. The system 45 for depositing an adhesive, visible on its own in FIG. 14, is also fixed to a rear face of the plate 32, whereas the cutting system 43 is fixed to an interior part of the latter, likewise the pressing element 44, as can be seen here.

The system 42 for driving the roll in rotation enables control of the rotation of the roll. It manages the speed at which the textile T exits the laying head 40 and immobilizes it when necessary. It includes a wheel 50 enabling frictional driving of the rotation of the roll B about the axis of rotation X. The rotation driving system 42 includes a guide carriage 51, a drive motor and a pneumatic cylinder. The unrolling of the roll B can be slaved to the movement of the robot outside of the phase of depositing the textile for laying-up, as explained hereinafter.

The system 43 for cutting the textile from the roll, visible in FIG. 11, includes a circular cutter, in this example a portable circular cutter 55, a cable-support chain 56 and a cylinder 57 with no rod. As can be seen in FIG. 7 in particular, the cutting system 43 comes to cover externally and to extend parallel to the system for guiding the textile 15 from the cassette 1.

The pressing element 44 is adapted to retain the textile T during the cutting thereof and to enable control of the end of the deposition of the lay of textile T during lay-up. In the example shown, the pressing element 44 includes three juxtaposed pressing plates 60 connected by a plurality of cylinders 63, as can be seen in FIG. 13 in particular, in order to come to press the textile against a lower part of a plate 19 of the subassembly for guiding the textile 15.

As can be seen in FIGS. 4 and 13, the textile T being unwound from the roll B is therefore guided outside the rear column 24 in a gap between on the one hand the subassembly guiding the textile 15 and on the other hand the cutting system 43 and the pressing element 44.

The system for depositing an adhesive 45 includes a roll of adhesive tape, for example double-sided tape, enabling deposition of this adhesive onto the fibrous reinforcing textile T or onto the support for lay-up. The system for depositing an adhesive 45 includes an adhesive head 65, a carriage 66 for moving the adhesive head and a cylinder represented in the form of a rectangle for pressing the adhesive head 65 against the lay-up support 116 or the textile T. The system for depositing an adhesive may be of the SAERfix® type sold by the company SAERTEX.

Figure 16:
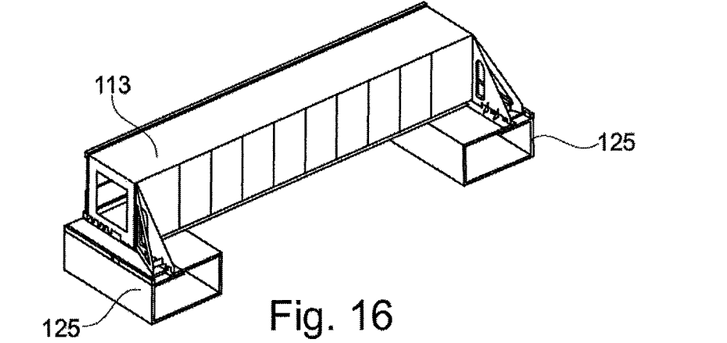
FIG. 16 is a diagrammatic perspective view of the crossmember of the installation from FIG. 15.

The crossmember 113 in the installation 100 is represented on its own in FIG. 16 and includes a bridge structure with two feet 125 adapted to be able to slide on the bench 114.

Figure 17:
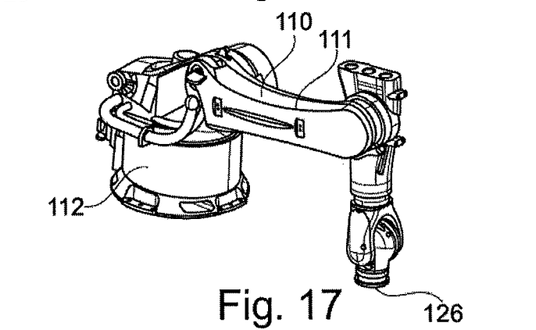
FIG. 17 is a diagrammatic perspective view, on its own, of the robot used for lay-up in the installation from FIG. 15.

The robot 110 represented on its own in FIG. 17 includes a base 112 resting on the crossmember 113 and an arm 111 mobile about six axes of rotation and the end 126 of which includes connecting means configured to be coupled to the connecting means 41 of the laying head 40.

The installation 100 may further include, as shown here, two storage spaces 115 at the two ends of the lay-up line. Each storage space 115 includes two zones each storing a cassette 1 in this example, as can be seen here. The cassettes 1 are represented ready to be loaded onto the laying head 40. The storage space 115 has been shown in FIG. 19, including two cassettes 1 identical to that represented in FIG. 1 and each provided with a roll B of textile T ready to be loaded. Each zone of the storage space 115 also includes a support cradle 140 to carry the cassettes 1.

Figure 18:
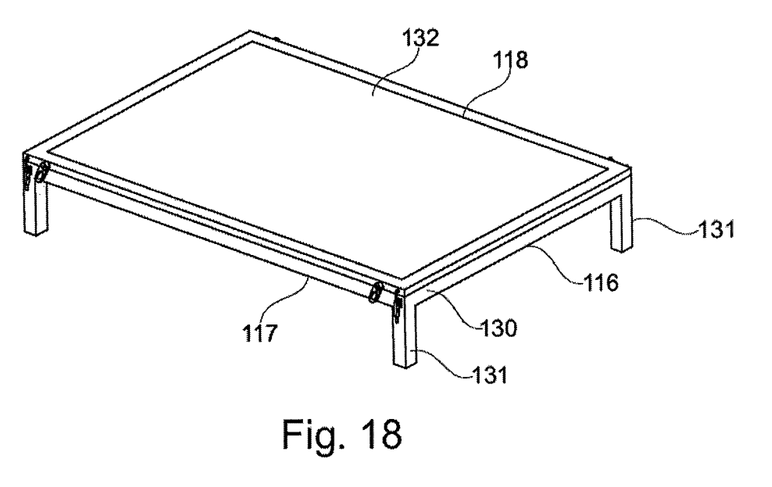
FIG. 18 is a diagrammatic perspective view of a table forming a lay-up support in the installation from FIG. 15.

The installation 100 further includes a laying support 116 formed by a plurality of fixed tables 117 represented on their own in FIG. 18 and each carrying a frame 118. There are four tables 117 for example. The laying support 116 is disposed on the lay-up line located under the crossmember 113 when the latter is moved in the direction D for laying up the fibrous reinforcement textile. The table 117 includes a rectangular chassis 130 with feet 131 at its corners and carrying the frame 118, which supports a sacrificial mattress 132 for producing seams.

A second robot 120 present in the installation 100 is also carried by the bench 114 and can be moved in the direction D. The robot 120 is used to lay up inserts, in particular PET foam or carbon unidirectional textile inserts, on the preform before and/or after laying up and/or to carry a stitching head in order to produce at least one seam on the preform.

A laying up operation using the installation 100 may be seen as follows.

The robot 110 is loaded with a cassette 1, in this example by connecting it with the aid of the connecting system 4 to the upper part of the head 30. The cassette 1 is loaded with a roll B of fibrous reinforcing textile T, for example NCF.

The method then consists in commanding the robot 110 to position the cassette 1 above the laying up support 116 and then moving the robot 110 in the laying up direction D and commanding the simultaneous unrolling of the roll B to produce the required preform.

All the elements of the laying head 40 may be used to fix adhesive to the textile T or the support 116, and in particular to cut the textile to the required length.

Figure 19:
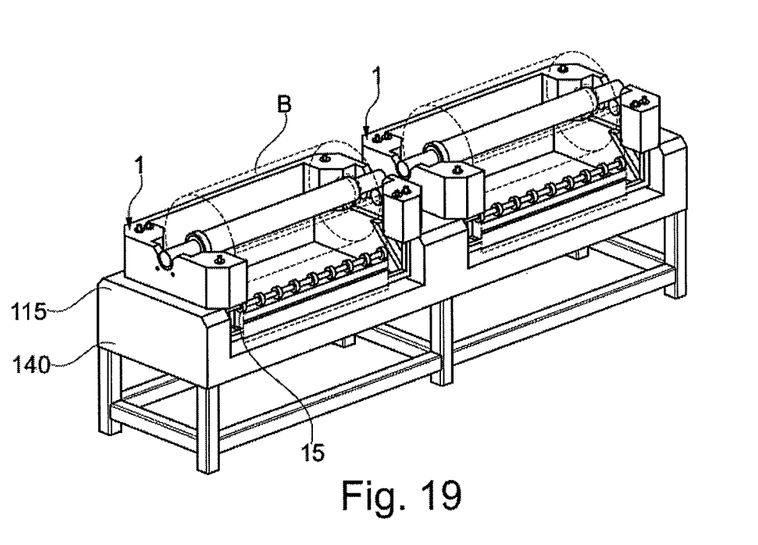
FIG. 19 is a diagrammatic perspective view of a cassette storage space of the installation from FIG. 15.

Once the cassette 1 has its roll emptied or almost emptied of textile T, or a change of roll type or textile is required, in particular to change the fibrous reinforcement or its dimensions, it is possible, in accordance with the method in accordance with the invention for refilling the cassette 1, to command the robot 110 carrying the first cassette 1 to unload the latter, for example into the storage space 115, with the aid of the connecting system 4 of the cassette 1, by detaching the latter from the laying head 40. The robot is then commanded to load a second cassette 1 present on the support cradle 140 in the storage space 115 by attaching the second cassette 1 with the aid of its connecting system 4 to the rest of the laying head 40. The installation 100 as a whole is then ready for further laying up.

During laying up or at some other time it is possible to prepare a cassette 1 by carrying out the following steps, namely:
  positioning the roll B on the receiving structure 2 of the cassette 1, by manipulating, in particular simultaneously, the two ends of the core of the roll B, and
  placing the cassette 1 in the storage space 115, in particular on a support cradle 140.

The method may further include the step consisting in inserting a mandrel, in particular an expandable mandrel, into each end of the core, in particular the cardboard core, of the roll B of fibrous reinforcing textile T, before positioning the roll B on the receiving structure 2. The method may further include the step consisting in adjusting the length of fibrous reinforcement unwound from the roll B relative to the subassembly for guiding the textile 15, after positioning the roll B on the receiving structure 2.

It is thus that the cassettes 1 shown in FIG. 19 in the storage space 115 are prepared with the textile T slightly unwound out of the subassembly for guiding the textile 15, as can be seen here.

The invention is not limited to the examples that have just been described.

In particular, the cassette 1 may be connected directly to the robot and/or carry one of the elements described in the embodiment shown as being carried by the laying head 40, for example the system for driving the roll in rotation or some other element.

The installation may include a robot for carrying a cassette, which may or may not have a connecting system, and at least one storage space including at least two zones, each receiving a cassette. In this case, the robot may include means for holding the cassette.

The cassette may be adapted to accommodate a plurality of different or identical rolls.

Without departing from the scope of the invention, the robot may be different or arranged on an installation providing in a different way its mobility relative to the gantry type laying up line associated with a carriage and a slide.

The invention claimed is:

1. A cassette of at least one fibrous reinforcement wound into the form of at least one roll of textile in order to carry out laying up, comprising:
  a receiving structure adapted to receive said at least one roll and enabling it to be unwound; and
  a connecting system for removably fixing the cassette to a laying head part itself adapted to be connected to a laying up robot,
  wherein the receiving structure has an upper surface configured to receive a core of the roll, including an upper surface with two recessed patterns for receiving ends of the core of the roll or of at least one mandrel carrying the roll.

2. The cassette as claimed in claim 1, further comprising a rotational support subassembly carried by the receiving structure.

3. The cassette as claimed in claim 1, further comprising a subassembly for guiding the fibrous reinforcement textile carried by the receiving structure and adapted to guide the textile during unrolling of the roll.

4. The cassette as claimed in claim 1, further comprising a measuring subassembly configured to at least one of measure the length unwound from the roll and to monitor the speed at which the fibrous reinforcement textile is fed.

5. The cassette as claimed in claim 4, wherein said measuring subassembly includes at least one of at least one sensor for measuring the length unwound from the roll and a sensor for monitoring the speed at which the fibrous reinforcing textile is fed.

6. The cassette as claimed in claim 3, wherein the subassembly for guiding the textile includes at least one of at least one roller and at least one plate configured to direct the fibrous reinforcement textile during unrolling of the roll.

7. A laying head for laying up at least one fibrous reinforcement textile wound into the form of at least one roll, comprising:
a first part of the laying head;
a cassette as claimed in claim 1, the cassette being disposed in a second part of the laying head and connected by the connecting system to the first part of the laying head; and
means for connecting it to the robot.

8. The head as claimed in claim 7, further comprising at least one element chosen in the group constituted by a system for driving the roll in rotation, a system for cutting the roll, a pressing element and a system for depositing an adhesive.

9. An installation for laying up fibrous reinforcing preforms on a laying up support, comprising at least one robot carrying a laying head as claimed in claim 7.

10. The installation as claimed in claim 9, further comprising a crossmember for supporting the robot mounted on a bench to enable movement of the robot along a longitudinal axis parallel to a laying up direction.

11. The installation as claimed in claim 9, further comprising at least one storage space accessible to the robot, each storage space including at least two zones each receiving a cassette and, in each zone, a support cradle for receiving a cassette.

12. A method for laying up a fibrous reinforcement preform on a laying up support using the installation as claimed in claim 9, comprising:
loading the robot with a cassette carrying at least one roll of fibrous reinforcement textile;
commanding the robot to position the laying head over the laying support; and
moving the robot in a laying up direction and commanding simultaneous unrolling of the roll to produce the preform.

13. The method as claimed in claim 12, further comprising loading a new cassette onto the robot after laying up each lay and before laying up the next lay.

14. A method of reloading a cassette using an installation as claimed in claim 11, consisting of:
commanding the robot carrying a first cassette to offload the latter with the aid of the connecting system of the first cassette; and
commanding the robot to load a second cassette present in the storage space with the aid of the connecting system of the second cassette.

15. The method as claimed in claim 14, wherein the method is executed after laying up each lay and before laying the next lay.

16. A method of preparing a cassette as claimed in claim 1, comprising:
positioning at least one roll of fibrous reinforcing textile on the receiving structure of the cassette; and
placing the cassette in a storage space.

17. The cassette as claimed in claim 1, wherein the receiving structure is adapted to enable unwinding of the at least one roll of textile using a textile clamping device.

* * * * *